US008636930B2

(12) United States Patent
Chujo et al.

(10) Patent No.: US 8,636,930 B2
(45) Date of Patent: Jan. 28, 2014

(54) THERMAL INSULATION FOAMED SHEET, THERMAL INSULATION FOAMED CONTAINER AND METHOD FOR PRODUCING THE SAME

(75) Inventors: Osamu Chujo, Tokyo (JP); Akio Morita, Tokyo (JP)

(73) Assignee: Tokan Kogyo Co., Ltd., Tokyo (JP)

( * ) Notice: Subject to any disclaimer, the term of this patent is extended or adjusted under 35 U.S.C. 154(b) by 997 days.

(21) Appl. No.: 12/277,482

(22) Filed: Nov. 25, 2008

(65) Prior Publication Data

US 2009/0081393 A1 Mar. 26, 2009

Related U.S. Application Data

(62) Division of application No. 10/523,569, filed as application No. PCT/JP02/12922 on Dec. 10, 2002, now abandoned.

(30) Foreign Application Priority Data

Jul. 30, 2002 (JP) ................................. 2002-222082
Jul. 30, 2002 (JP) ................................. 2002-222083

(51) Int. Cl.
*B29C 44/04* (2006.01)
(52) U.S. Cl.
USPC ........................................................ 264/45.1
(58) Field of Classification Search
USPC ........................................................ 264/45.1
See application file for complete search history.

(56) References Cited

U.S. PATENT DOCUMENTS 4,435,344 A * 3/1984 Iioka .......................... 264/45.1
2002/0041046 A1 4/2002 Hartjes et al.

FOREIGN PATENT DOCUMENTS

| JP | 57110439 | 7/1982 |
| JP | 61246041 | 11/1986 |
| JP | 2000177039 | 6/2000 |
| JP | 2001088160 | 4/2001 |
| JP | 2001247118 | 9/2001 |

OTHER PUBLICATIONS

Machine translation of JP 2000-177039, see IDS filed Jan. 27, 2005 from U.S. Appl. No. 10/523,569.

* cited by examiner

*Primary Examiner* — Larry Thrower
(74) *Attorney, Agent, or Firm* — Westerman, Hattori, Daniels & Adrian, LLP (57) ABSTRACT

The present invention relates to a thermal insulation foamed sheet whose foaming height can be kept high by increasing an expansion ratio of foaming cells, thermal insulation foamed container using this and method for producing the same.
In the thermal insulation foamed sheet according to the present invention, a foaming plane made of a foaming cell group is formed by heating the sheet in which a synthetic resin film is laminated on base paper and foaming the synthetic resin film using moisture contained in the base paper, and at least a part of the foaming plane is vacuum-suctioned so as to increase the foaming height of the foaming cell. Also, there can be made a thermal insulation foamed container having this foaming plane on at least its body section.

20 Claims, 5 Drawing Sheets

THERMAL INSULATION FOAMED SHEET, THERMAL INSULATION FOAMED CONTAINER AND METHOD FOR PRODUCING THE SAME

This application is a divisional of U.S. patent application Ser. No. 10/523,569, filed Jan. 27, 2005 now abandoned, which is the U.S. national phase application under 35 U.S.C. §371 of International Patent Application No. PCT/JP2002/012922, filed Dec. 10, 2002, and claims the benefit of Japanese Patent Application No. 2002-222082, filed Jul. 30, 2002 and Japanese Patent Application No. 2002-222083, filed Jul. 30, 2002. The International Application was published in Japanese on May 2, 2004 as WO 2004/011241 A1 under PCT Article 21(2). The disclosures of all the prior applications are hereby incorporated by reference in their entireties.

FIELD OF THE INVENTION

The present invention relates to a thermal insulation foamed sheet, thermal insulation foamed container formed by vacuum-suctioning a foamed cell group foamed mainly using moisture in base paper and method for producing the same.

BACKGROUND ART

For insulating cups made from base paper as a base material, several structures provided with good touching feeling and insulation by foaming a laminate film laminated on the base material have been proposed.

The JP-A-57-110439, for example, discloses such a structure that a water content contained in paper is vaporized by heating and this vaporized water content is used as a foaming material so as to foam a thermoplastic synthetic resin such as polyethylene film.

With this method, however, the foaming height is limited, and there is a problem that, even if time for heating is prolonged, the foaming height can not be increased.

On the other hand, in the JP-A-61-246041, a foam sheet and a paper board in which a large number of small holes for ventilation are penetrated is integrally joined with a large number of partial adhesives so as to form a complex sheet, and by vacuum-suctioning this foam sheet after heated and softened at a position other than the partial adhesives and from the side of the foam sheet to inflate and form the foam sheet along a forming die so that swollen projections are formed on the foam sheet.

In this case, it is so constituted that the softened foam sheet is suctioned at a position other than the partial adhesion parts for expansion, which takes time and labor and causes the swollen portion to be largely expanded. That constitution is not suitable for a cup, and it is difficult to form a foaming plane with good feeling.

Also, the applicant proposed another foaming structure in the JP-A-2000-177039 that a joining inhibitor agent such as silicone oil is applied in spots on a paper board, on which a laminate film is joined, and the surface joined with said laminate film is heated and then, portions on the laminate film where the joining inhibitor agent was applied is swollen by vacuum-suctioning. This structure has achieved a due success.

In this structure, since the joining inhibitor agent is applied in spots on the paper board and the laminate film which was made plastic by heating is extended on said applied portions by vacuum-suctioning so as to swell and form a foamed portion, the foamed portions are arranged in the scattered manner and a continuous foaming plane without a gap can not be obtained.

The inventors have, after a study in view of the above, developed a structure a foaming plane with continuing foaming cells without a gap by foaming a synthetic resin film with moisture in base paper as a foaming agent and the foaming height is gradually increased by vacuum-suctioning this foaming plane.

That is, as with the above moisture foaming in JP-A-57-110439, the moisture contained in the base paper is vaporized by heating, and this vaporized moisture is used as a foaming material to foam a thermoplastic synthetic resin such as polyethylene film.

The synthetic resin film forming this foaming plane is preferably polyethylene, but a thermoplastic film such as polypropylene, polyvinylchloride, polystyrene, polyester and nylon is used.

The base paper with the basis weight of 100 $g/m^2$ to 400 $g/m^2$ containing about 2% to 10%, preferably 4.5% to 8% of water is used.

Heating temperature for foaming is generally in a range of about 110 to 200 degrees centigrade, but it is determined as appropriate by type of the base paper and thermoplastic resin film to be used.

According to experiments, in the case of a low-density polyethylene, an expansion ratio of 8 times was obtained with the heating temperature of 135 degrees centigrade and the heating time of 90 seconds. It was also confirmed that the foaming height can be increased to about 15 times when the heating time is 5 minutes.

When the heating temperature is raised, the water content in the base paper is decreased, but the expansion ratio was lowered.

This might be because the temperature of the resin largely exceeds a melting point, whereby foaming cells are broken, and the strength of the resin is lowered and the foaming cells shrink when cooled.

When the moisture in the base paper is used in this way, the expansion ratio can be temporarily increased but there is a critical problem that the foaming cells shrink at cooling and the foaming height can not be maintained.

In connection with that, in order to prevent contraction of the foaming cells at cooling, there can be a method that the strength of the foaming cells is reinforced by rapid cooling.

Then, water cooling and rapid cooling at −5 degrees centigrade were performed, but the foaming height can not be kept high.

Next, a method that a negative pressure is applied to the foaming plane so as to restrain contraction of the foaming cells as well as that the foaming cells are heightened by vacuum-suctioning was tried, and it was found that the height of the foaming plane can be maintained, which lead to successful completion of the present invention.

That is, a main object of the present invention is to provide a thermal insulation foamed sheet by forming a foaming plane made of a foamed cell group through foaming of a synthetic resin film mainly using moisture contained in base paper and by keeping the foaming height of this foaming plane by vacuum-suctioning, a thermal insulation foamed container using this and method for producing the same.

DESCRIPTION OF THE INVENTION

For the thermal insulation foamed sheet according to the present invention, a sheet in which a synthetic resin film is laminated on base paper is heated, a foaming plane made of a foamed cell group is formed by foaming the synthetic resin film mainly using moisture contained in base paper, and the expansion ratio of the foaming cells is increased by vacuum-suctioning at least a part of the foaming plane so that the synthetic resin film can be foamed using the moisture contained in the base paper and the high expansion ratio can be maintained by vacuum-suctioning the foaming cells so as to prevent contraction of the foaming cells foamed at a high expansion ratio.

Also, it is preferable that at least a part of said foaming plane is vacuum-suctioned so that a part of foaming cells in the foamed cell group is floated and adjacent foaming cells are stuck together so that the apparent foaming height is made equal. Said foaming plane is formed on the whole or a part of the sheet.

By this, the high expansion ratio can be maintained by preventing contraction of the foaming cells foamed at a high ratio.

Also, since the foaming plane is formed by heating and vacuum-suctioning, the heating temperature can be lowered and the heating time can be reduced. And moreover, deodorization of odors of ink, solvents, resin or lamination can be performed at the same time by vacuum-suctioning.

With the thermal insulation foamed container using the thermal insulation foamed sheet of the present invention, said thermal insulation foamed sheet is used at least on the body section of the container, and insulation efficiency is improved by high foaming height, and its feeling can be made better.

In the case of the thermal insulation foamed container having said foaming plane at least on the body section, a synthetic resin film is laminated on at least one side of base paper with the other side also subjected to lamination, and the body section or the container is heated so as to form a foaming plane made of a foamed cell group by foaming said synthetic resin film mainly using moisture contained in the base paper, and at least a part of the foaming plane is vacuum-suctioned so as to increase the foaming height of the foaming cell.

Also, the foaming plane may be formed on a part of the body section or a part of the container.

Moreover, if a constraint means is provided for constraining a sheet on which the foaming plane is formed at a predetermined position in a die to prevent it from being moved or deformed so that an even suctioning force acts on the foaming plane in the above vacuuming, the higher foaming height with more evenness can be obtained. Next, the method for producing the thermal insulation foamed sheet according to the present invention is comprised of a step of forming a foamed surface made of a continuous foaming cell group by heating a sheet in which a synthetic resin film is laminated on base paper and by foaming the synthetic resin film mainly using moisture contained in the base paper, and a step of increasing the foaming height of the foaming cell by vacuum-suctioning at least a part of the foaming plane.

Also, the method for producing the thermal insulation foamed container having said foaming plane at least on its body section is comprised of a step of forming a foaming plane made of a foamed cell group by foaming a synthetic resin film mainly using moisture contained in base paper, on both sides of which are laminated, through heating, and a step of increasing the foaming height of the foaming cell by vacuum-suctioning at least a part of the foaming plane. And in the above vacuum-suctioning, it is preferable to provide a step of constraining the sheet on which a foaming plane is formed at a predetermined position in a die to prevent it from being moved or deformed but an even suctioning force is applied on the foaming plane.

Preferred embodiment of the thermal insulation foamed sheet, thermal insulation foamed container and method for producing the same according to the present invention will be explained below.

Figure 1:
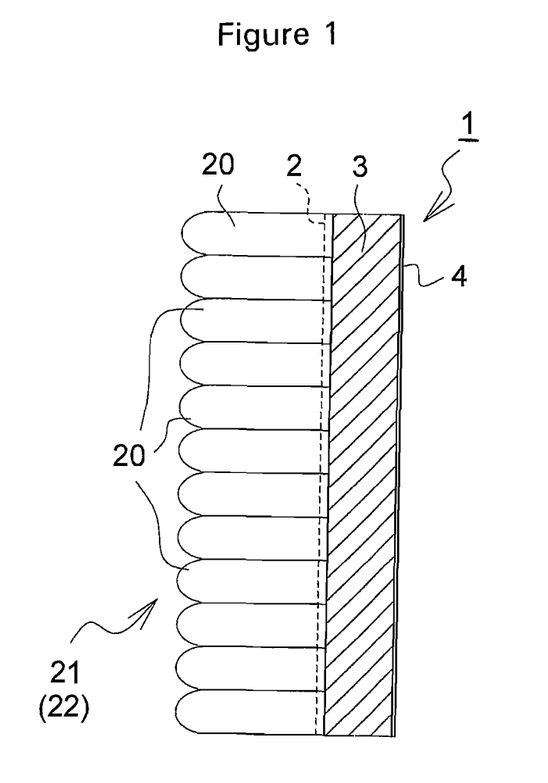
FIG. 1 is a partial sectional view schematically showing a thermal insulation foamed sheet of a first preferred embodiment.
Figure 2:
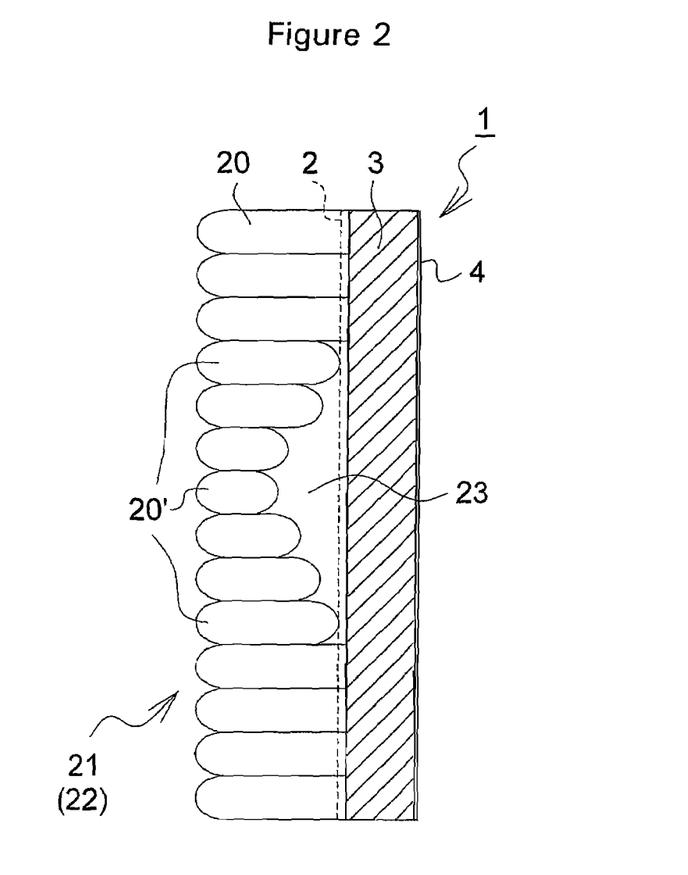
FIG. 2 is a partial sectional view schematically showing a thermal insulation foamed sheet of a second preferred embodiment.

A thermal insulation foamed sheet 1 has the same construction as that used in the conventional moisture foaming, and as shown in FIGS. 1 and 2, base paper 3 is used for an intermediate layer to be a base material, a synthetic resin film 2 such as low-density polyethylene shown by a dotted line is laminated on a foaming plane, and a laminate film 4 made of a synthetic resin film or aluminum foil which is hard to be foamed is used for an inner layer.

In this invention, moisture contained in the base paper is mainly used for the above moisture foaming, but if ink is applied or water-retentive substances are added onto the above sheet 1, for example, moisture foaming for which this moisture is also used is also included.

Also, as for the above sheet 1, not only the construction as a laminate sheet in which lamination has been performed in advance as above but also a three-layer construction in which either of an inner or an outer layer or both films are integrally laminated after being formed into the container state is included.

In essence, it is only necessary that both surfaces of the base paper 3 are covered by the laminate film or the like when heating the above laminate sheet. That is because moisture would be directly evaporated into air if one surface of the base paper is exposed when heating.

In this invention, one unit of foam of the synthetic resin film is a foaming cell 20, a state where the foaming cells 20 are continuously gathered is a foaming cell group 21 and a state where the foaming cell group 21 is formed in the surface state is a foaming plane 22.

In this preferred embodiment, the foaming cell 20 formed by moisture foaming is further extended in the height direction by vacuum-suctioning to have the completed foaming cell 20, but in this invention, the height of the foaming cell 20 formed by moisture foaming and that of the vacuum-suctioned foaming cell 20 may be substantially equal. That is, contraction after moisture foaming may be restrained by vacuum-suctioning.

Also, the sequence of a heating process for the above moisture foaming and a vacuum-suctioning process by vacuum is not limited to that of the vacuum-suctioning process subsequent to the heating process or that of the vacuum-suctioning process during the heating process but it also includes simultaneous execution of the above heating process and the vacuum-suctioning process and moreover performance of the heating process during the vacuum-suctioning process.

Next, an experimental example using a sample will be described.

In this preferred embodiment, the sample is a sheet constituting a body section of a cup-shaped insulating paper container.

For the sheet of this body section, the base paper 3 with the basis weight of 250 g/m² is used for the intermediate layer to be the base material, a low-density polyethylene of 50 μm is laminated on the outer layer 2 to be the foaming plane, and a low-foaming synthetic resin film of 18 μm is used for the inner layer 4 to have a three-layer structure. As a heating method, a thermostatic heating apparatus, Super Temp Oven STPH-200 (by Tabei-Espec Corporation) is used with the wind speed of LOW and a damper fully opened, and a gear motor is used for uniform heating while rotating it with the sample on the sample-frame so as to foam the outer layer.

A sample 1 was heated at 135 degrees centigrade for 90 seconds.

A sample 2 was heated at 165 degrees centigrade for 45 seconds.

A sample 3 was heated at 165 degrees centigrade for 90 seconds.

A control sample was heated at 135 degrees centigrade for 90 seconds.

After foaming as above, vacuum-suctioning was performed using vacuum as follows.

After heating, immediately after taking out of the above oven, the sample is placed in a bucket-shaped die for vacuum to apply a negative pressure on the foaming plane. In this preferred embodiment, the die is for vacuum-suctioning of a sheet having the foaming plane, that is, the body section of a cup-shaped container, and the cup-shaped container is set so that its center line is fixed by the constraint means coaxially with the center line of the die.

This constraint means may be any method such that protrudes from the inner peripheral surface of the die and abuts on the foaming plane side, that fixes the back side of the foaming plane or that fixes the end of the sheet. And the die has its inner peripheral surface sized so that a gap for suctioning the foaming cell 20 is generated between the foaming plane of the cup-shaped container and the suctioning surface of the die.

Figure 3:
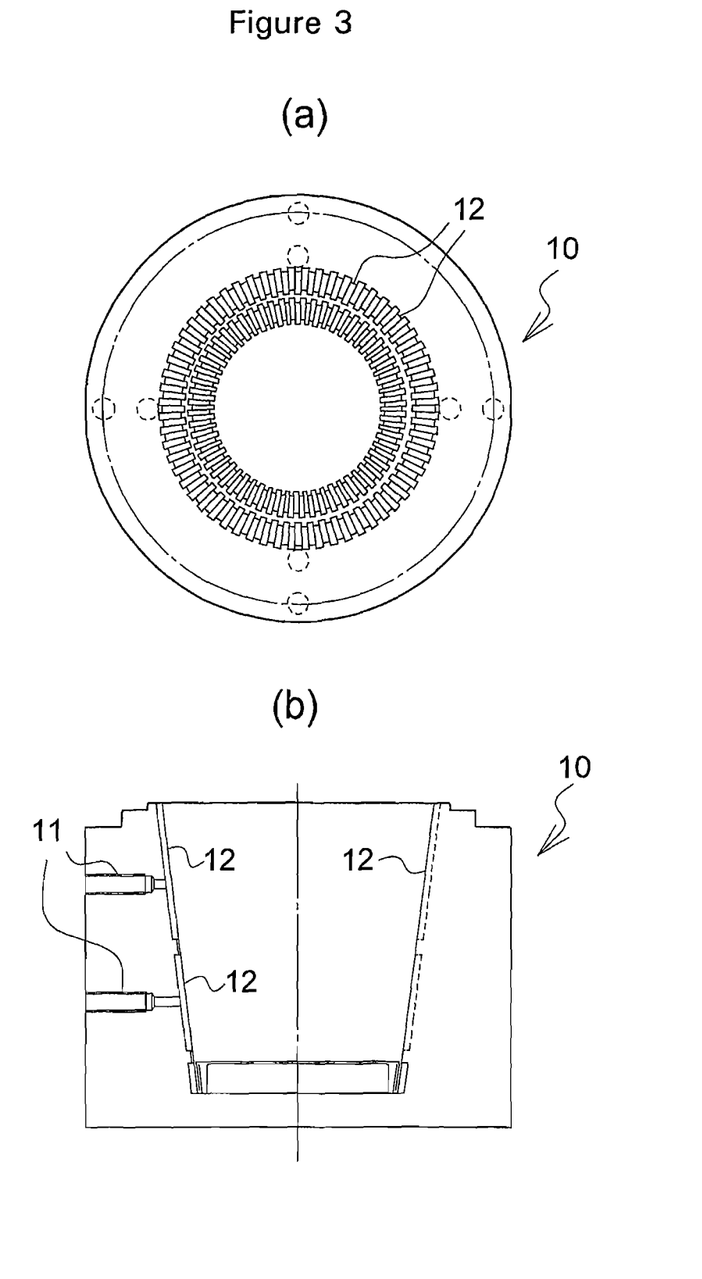
FIG. 3(a) is a plan view of a die for vacuum-suctioning having a vertical rib for fixing a sheet on its internal peripheral surface.
FIG. 3(b) is a sectional view thereof.

For the sample 1, a vertical rib 12 is provided on the inner surface of a bucket-shaped die 10 (see FIG. 3) as the constraint means.

The vertical ribs 12 are arranged with an equal interval (2 mm-pitch as an example) along the outer circumference direction of the body section, and their tip ends abut on the foaming plane.

And the container on which the foaming plane is formed of the sample 1 is fixed with the above vertical rib 12, and a negative pressure of 51 kpa is applied by vacuum suctioning for 10 seconds.

At this time, the vertical rib 12 is fixed so that the above container is not even slightly moved or deformed in the die, and pressure of the vertical rib 12 depresses the abutting foamed cell group to be a flat surface and then, the surface of foamed cell group not in contact with the vertical rib 12 is vacuum-suctioned.

For the sample 2, a ring-shaped lateral rib 13 (see FIG. 4) abutting on the foaming plane is provided as a constraint means in plural stages on the inner surface of the bucket-shaped die 10, and the container with the foaming plane formed is fixed with the above lateral rib 13 and then, a negative pressure of 67 kpa is applied by vacuum-suctioning for 10 seconds.

Figure 4:
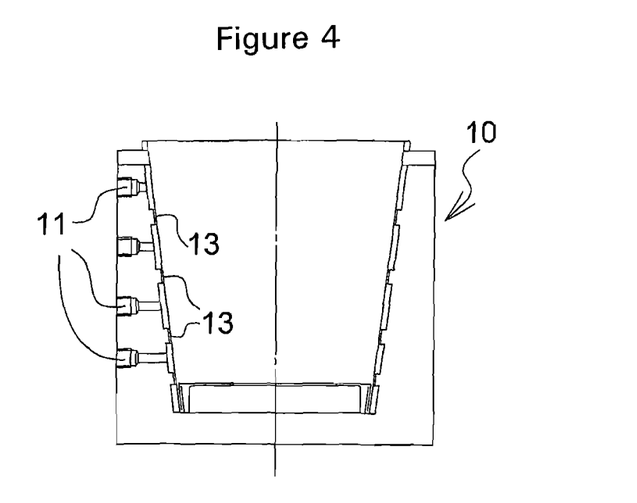
FIG. 4 is a sectional view of a die for vacuum-suctioning having a ring-state lateral rib for fixing a sheet on its internal peripheral surface.

In this case, too, the lateral rib 13 is fixed so that the above container is not moved or deformed in the die, and pressure of the lateral rib 13 depresses the abutting foamed cell group to be a flat surface and then, the surface of foamed cell group not in contact with the lateral rib 13 is vacuum-suctioned.

The sample 3 is placed in the bucket-shaped die 10 (See only the lower part of FIG. 5) without the above ribs, and a negative pressure of 67 kpa is applied by vacuum-suctioning for 10 seconds.

In this case, a constraint means for fixing the sheet with a foaming plane such as a rib formed is not provided in the die.

The control sample is not given the above vacuum-suctioning. The cross section of the thermal insulation foamed containers constituted as above is observed by a microscope, and the foaming height is measured at 4 points to acquire an average value.

The average value of the foaming height for the control sample is 283 μm.

The sample 1 has the average value of 967 μm at the upper end of the foaming cell and an expansion ratio of about 20 times.

Here, the cross section of the sample 1 of the first preferred embodiment made of the foaming cell in which the foamed cell group adheres to the base paper is shown schematically in FIG. 1. 20 is the foaming cell formed in a large number and adhering to the base paper 3, and the foaming cells 20 are integrally stuck to each other closely to maintain the height of the foamed cell group 21 or the foaming plane 22.

Also, a cross section of the sample 1 in the second preferred embodiment is shown schematically in FIG. 2. The second preferred embodiment is constituted in the same conditions as in the above first preferred embodiment, and a discrepancy is caused in an expansion ratio of each of the foaming cells in the foamed cell group at foaming. In this case, a foaming cell 20' with a lower expansion ratio in the foaming cell group is floated from the base paper 3 and separated by vacuum-suctioning of the foaming cell, while the foaming cell 20 with a higher expansion ratio is stuck integrally to the base paper 3, and these adjacent foaming cells 20, 20' are stuck to each other. By this, in the foamed cell group 21, the actual foaming height of the foaming cell 20 foamed at the high expansion ratio and the apparent foaming height of the foaming cell 20' foamed at the foaming ratio lower than that are kept almost at the same height, and the top level of the foaming plane 22 is aligned equal without any irregularity. Numeral 23 in the Fig. is a gap generated at a floated portion.

The difference between the first preferred embodiment and the second preferred embodiment is whether a part of the foaming cell adheres to the base paper 3 or not and the rest is the same. Therefore, the following explanation shall apply both to the first and the second preferred embodiments.

Next, the average value when the heating time is 70 seconds under the same conditions as those for the sample 1 was 870 μm and 1001 μm for 90 seconds.

The average value was 859 μm for the sample 2.

The average value was 400 μm for the sample 3.

Also, it was confirmed that, by suctioning the foaming cell through vacuuming the foaming plane immediately after heating, the foaming cell does not contract by cooling but the foaming height can be made extremely high when compared with the case of foaming only by moisture.

The case of vacuum-suctioning of the foaming plane after heating was shown, but it can be performed during heating and also, the magnitude of the negative pressure and the suctioning time can be experimentally determined at an optimum value.

Also, when the container or sheet having the foaming plane is moved or deformed in the die at suctioning and an even suctioning force can not be applied to the foamed cell group, it is preferable to fix or constrain the container or sheet at a predetermined position so that the even suctioning force is applied on the foaming plane before performing vacuum-suctioning.

In this case, since the even vacuum-suctioning force is applied onto the foaming plane of the container (or sheet) in suctioning, a high and even expansion ratio can be obtained.

For the sample 3, the foaming height is lower than the other samples 1 and 2, but that is because the sheet is deformed by vacuum-suctioning. It was confirmed that provision of a means for fixing the above sheet in the die is necessary.

Figure 5:
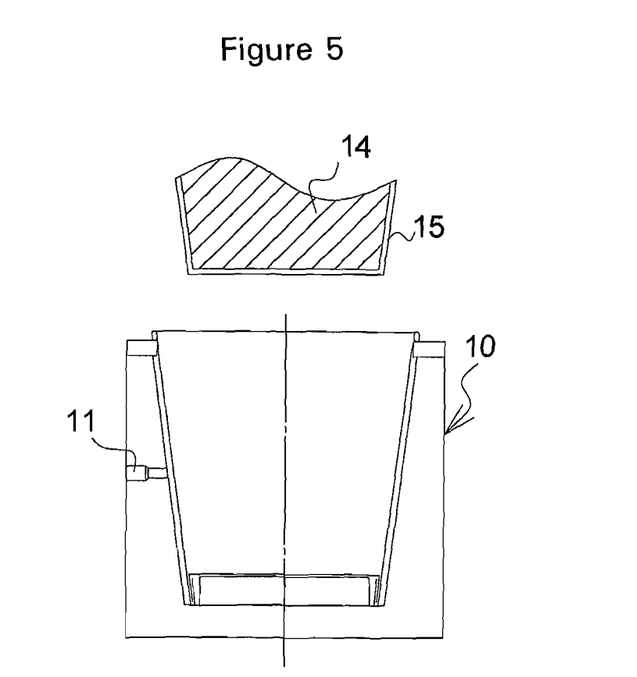
FIG. 5 is a sectional view of a die for vacuum-suctioning not having a constraint means on its inner peripheral surface but having a fixing fixture mounted on the inner wall surface of a container for constraining the container to be set inside at suctioning.

In this case, as shown in the upper part of FIG. 5, for example, by using a fixture 14 so that the sheet formed in the shape of a container is fixed to the inner wall surface of the container and can be set at a predetermined position of the die 10, a much higher expansion ratio can be obtained as with the other samples.

The means for constraining this sheet formed in the shape of a container is not limited to the above preferred embodiment, but any means that fixes the sheet on which the foaming plane is formed at a predetermined position at the center of the die so that it is not moved or deformed in the die at vacuum-suctioning may be used. It can be formed either integrally with the die or separately, or it can be a contact type or a non-contact type.

Moreover, the container is fixed at a predetermined position from the outer wall surface side, but the means may fix the container at the predetermined position from the inner wall side.

Also, when a constraint means having an abutted surface to be pressed onto a part of the foaming plane such as the vertical rib or the lateral rib in the above preferred embodiments is used, a portion in the foaming plane corresponding to the abutted face is depressed to be a recess portion, while a portion to be vacuum-suctioned is relatively raised to be a projecting portion, and an irregular pattern can be formed on this foaming plane. Thus, when the pattern is to be in the star-shaped, a geometric shape or any other desired shape, the shape of the abutted face of the constraint means is directly made into the shape of the pattern to express the pattern in the recess portion, or the shape of the abutted face can be recessed along the profile of the pattern so that the pattern is floated and expressed by projecting portion. Or, these can be combined for expression.

By this, the container or sheet can be constrained at vacuum-suctioning and at the same time, the irregular pattern can be formed on the foaming plane as if the shape of the abutted face of the above constraint means is copied. This pattern can be expressed in the various ways such as those formed on a part of the foaming plane, those formed in the scattered manner, formed in the emboss state or formed in the continuous pattern by designing the shape of the abutted face.

Figure 6:
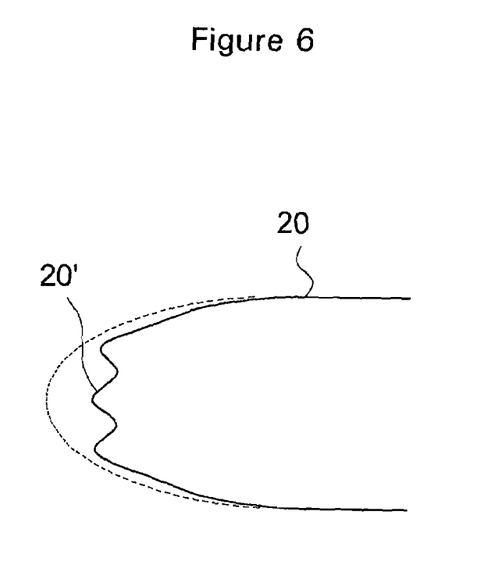
FIG. 6 is a schematic diagram explaining deformation at the tip end of a foaming cell.

Next, the foaming cell formed in this way maintains its shape by vacuum-suctioning, but air in the foaming cell contracts by cooling and gradually bends with release of tension at its tip end as shown in FIG. 6.

By this, the tip end 20' of each of the completed foaming cells 20 is softened so that hand-touch feeling is made excellent.

And according to this manufacture, it is possible to adjust the foaming plane to a desired foaming height by experimentally obtaining data on foaming height by adjusting heating time and negative pressure.

Also, by applying printing ink on the synthetic resin film forming the foaming plane in advance, the height of the foaming plane is not made even but the height can be adjusted.

When compared with foaming using moisture in the base paper, heating time can be reduced and heating temperature can be lowered, whereby labor and costs can be reduced.

And as the expansion ratio can be made high, insulation can be improved.

Also, through vacuum-suctioning, odors of ink, solvents, etc. generated at forming can be suctioned at the same time for deodorization.

In the above preferred embodiments, the case where the thermal insulation foamed sheet is a container in the shape of a cup is shown, but it can be anything other than containers.

The foaming plane may be formed either on the inner or outer surface of the base paper.

Also, foaming and suctioning may be performed after forming into a predetermined shape in advance or a sheet to which foaming and suctioning have been applied may be assembled in a desired shape.

Moreover, the foaming plane may be formed on a part of the sheet or the body section or partially formed on the container.

The invention claimed is:

1. A method for producing a thermal insulation foamed sheet comprising:
    a first step of forming a foaming plane made of a continuous foamed cell group by heating a sheet in which a synthetic resin film is laminated on base paper and by foaming the synthetic resin film mainly using moisture contained in the base paper; and
    a second step of increasing the foaming height of the foaming cell by at least a part is vacuum-suctioned in a die whose size is set so that a gap for suctioning a foaming cell is generated between said foaming plane and a suctioning surface provided in the die,
    wherein an expansion ratio of the foaming cell is higher in the second step than the first step,
    further including said expansion ratio in the first step being a ratio of the height immediately after first step expansion to a height immediately prior to first step expansion and said expansion ratio in the second step being a ratio of the height immediately after second step expansion to a height immediately prior to second step expansion.

2. A method for producing a thermal insulation foamed sheet in claim 1, wherein the foamed cell group is made of foaming cells adhering to the base paper.

3. A method for producing a thermal insulation foamed sheet in claim 1, wherein the foamed cell group is made of the foaming cells adhering to the base paper and the foaming cells separated and floated from the base paper, and the adjacent foaming cells stuck together to make the apparent foaming height even.

4. A method for producing a thermal insulation foamed sheet in claim 2, wherein a step is provided to constrain the sheet in which the foaming plane is formed at a predetermined position in a die to prevent it from being moved or deformed so that an even suctioning force is applied on the foamed surface at vacuum-suctioning.

5. A method for producing a thermal insulation foamed sheet in claim 4, further comprising constraining the sheet by using a rib protruding from an inner surface of the die.

6. A method for producing a thermal insulation foamed sheet in claim 1, including forming said foaming plane with continuing foaming cells without gaps by said second step forming a height of the foaming cell such as to be substantially equal by restraining contraction due to cooling after moisture foaming of said first step by vacuum suction foaming of said second step.

7. A method for producing a thermal insulation foamed sheet in claim 1, further including fixing said sheet at a predetermined position during said second step with a constraining means so that an even suction force is applied and an even expansion ratio is achieved.

8. A method for producing a thermal insulation foamed sheet in claim 7, wherein said constraining means is a contact member that contacts a wall of said sheet.

9. A method for producing a thermal insulation foamed sheet in claim 1, further including performing said second step subsequent to said first step in a manner to restrain contraction due to cooling after said first step by vacuum suction foaming of said second step.

10. A method for producing a thermal insulation foamed container having a foaming plane at least on a body section comprising:
a first step of forming a foaming plane made of a foamed cell group by foaming a synthetic resin film in which both sides of base paper is laminated mainly using moisture contained in the base paper through heating; and
a second step of increasing the foaming height of the foaming cell by at least a part is vacuum-suctioned in a die whose size is set so that a gap for suctioning a foaming cell is generated between said foaming plane and a suctioning surface provided in the die,
wherein an expansion ratio of the foaming cell is higher in the second step than the first step,
further including said expansion ratio in the first step being a ratio of the height immediately after first step expansion to a height immediately prior to first step expansion and said expansion ratio in the second step being a ratio of the height immediately after second step expansion to a height immediately prior to second step expansion.

11. A method for producing a thermal insulation foamed container in claim 10, wherein the foamed cell group is made of foaming cells adhering to the base paper.

12. A method for producing a thermal insulation foamed container in claim 10, wherein the foamed cell group is made of the foaming cells adhering to the base paper and the foaming cells separated and floated from the base paper, and the adjacent foaming cells stuck together to make the apparent foaming height even.

13. A method for producing a thermal insulation foamed container in claim 10, wherein a step is provided to constrain the sheet in which the foaming plane is formed at a predetermined position in a die to prevent it from being moved or deformed so that an even suctioning force is applied on the foaming plane at vacuum-suctioning.

14. A method for producing a thermal insulation foamed sheet in claim 13, further comprising constraining the sheet by using a rib protruding from an inner surface of the die.

15. A method for producing a thermal insulation foamed sheet in claim 5, wherein the rib is vertically or laterally provided on the inner surface of the die.

16. A method for producing a thermal insulation foamed sheet in claim 14, wherein the rib is vertically or laterally provided on the inner surface of the die.

17. A method for producing a thermal insulation foamed container in claim 10, including forming said foaming plane with continuing foaming cells without gaps by said second step forming a height of the foaming cell such as to be substantially equal by restraining contraction due to cooling after moisture foaming of said first step by vacuum suction foaming of said second step.

18. A method for producing a thermal insulation foamed container in claim 10, further including fixing said sheet at a predetermined position during said second step with a constraining means so that an even suction force is applied and an even expansion ratio is achieved.

19. A method for producing a thermal insulation foamed container in claim 18, wherein said constraining means is a contact member that contacts a wall of said sheet.

20. A method for producing a thermal insulation foamed container in claim 10, further including performing said second step subsequent to said first step in a manner to restrain contraction due to cooling after said first step by vacuum suction foaming of said second step.

* * * * *